US011455640B2

United States Patent
Ou et al.

(10) Patent No.: US 11,455,640 B2
(45) Date of Patent: Sep. 27, 2022

(54) TRANSACTION INDICATOR MONITORING METHODS, APPARATUSES, AND DEVICES

(71) Applicant: Advanced New Technologies Co., Ltd., Grand Cayman (KY)

(72) Inventors: Hang Ou, Hangzhou (CN); Xiaohui Liu, Hangzhou (CN); Jiangyu Zheng, Hangzhou (CN); Yuhong Xiao, Hangzhou (CN); Ruohan Chang, Hangzhou (CN); Cheng Jin, Hangzhou (CN); Dechao Qin, Hangzhou (CN); Qimeng Zhou, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 100 days.

(21) Appl. No.: 17/085,951

(22) Filed: Oct. 30, 2020

(65) Prior Publication Data

US 2021/0049609 A1 Feb. 18, 2021

Related U.S. Application Data

(63) Continuation of application No. PCT/CN2019/091027, filed on Jun. 13, 2019.

(30) Foreign Application Priority Data

Jul. 17, 2018 (CN) .......................... 201810786573.X

(51) Int. Cl.
*G06Q 20/00* (2012.01)
*G06Q 20/40* (2012.01)
*G06F 17/18* (2006.01)

(52) U.S. Cl.
CPC ..... *G06Q 20/4016* (2013.01); *G06Q 20/4093* (2013.01); *G06F 17/18* (2013.01)

(58) Field of Classification Search
CPC ........... G06Q 2220/00; G06Q 2220/10; G06Q 2220/16; G06Q 20/4016; G06Q 20/4093;
(Continued)

(56) References Cited

U.S. PATENT DOCUMENTS 6,804,627 B1 * 10/2004 Marokhovsky ..... G06F 11/3409
702/182
8,306,891 B1 11/2012 Findlay, III et al.
(Continued)

FOREIGN PATENT DOCUMENTS

CN 104283934 1/2015
CN 104933080 9/2015
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Dante Ravetti
(74) *Attorney, Agent, or Firm* — Fish & Richardson P.C.

(57) ABSTRACT

A transaction indicator monitoring computer-implemented method, medium, and system are disclosed. One computer-implemented method includes obtaining sampling sequences of a transaction indicator of transaction data under multiple sets of transaction dimension values, each set of transaction dimension values corresponding to one sampling sequence, a first sampling sequence including values of the transaction indicator at a predetermined quantity of sampling points under a first set of transaction dimension values, and a value of the transaction indicator at a target sampling point is a first actual value. An estimated value of the transaction indicator at the target sampling point in the first sampling sequence is calculated based on the first
(Continued)

sampling sequence and compared with the first actual value, to determine whether the transaction indicator at the target sampling point under the first set of transaction dimension values corresponding to the first sampling sequence is abnormal. An abnormality prompt is given.

30 Claims, 5 Drawing Sheets

(58) Field of Classification Search
CPC ... G06Q 10/06393; G06Q 40/04; G06F 17/18
USPC ................................ 705/16, 21; 380/44, 262
See application file for complete search history.

(56) References Cited

U.S. PATENT DOCUMENTS

| | | | |
|---|---|---|---|
| 2004/0176934 A1* | 9/2004 | Kihira | G01N 17/006 |
| | | | 703/5 |
| 2009/0222243 A1 | 9/2009 | Zoldi et al. | |
| 2009/0292568 A1 | 11/2009 | Khosravani et al. | |
| 2010/0306533 A1* | 12/2010 | Phatak | H04L 63/107 |
| | | | 713/168 |
| 2012/0005749 A1 | 1/2012 | Zoldi et al. | |
| 2015/0081524 A1 | 3/2015 | Brereton et al. | |
| 2016/0253672 A1 | 9/2016 | Hunter et al. | |

FOREIGN PATENT DOCUMENTS

| | | |
|---|---|---|
| CN | 107480703 | 12/2017 |
| CN | 107491970 | 12/2017 |
| CN | 107943809 | 4/2018 |
| CN | 108269189 | 7/2018 |
| CN | 108282533 | 7/2018 |
| CN | 109035021 | 12/2018 |
| TW | 201507403 | 2/2015 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2019/091027, dated Sep. 19, 2019, 9 pages [with partial English translation].

* cited by examiner

| data set + | graph  component | application |
|---|---|---|

- alipayda_us_dev.hk_test_...
- alipayda_us_dev.hk_rejec...
- alipayda_us_dev.hk_test_...

abnormality detection   XTABLE

🔍 enter key words

- ☐ 📅 report_date
- ☐ Abc auth_decision
- ☐ Abc avs_result
- ☐ Abc bank_country
- ☐ Abc card_brand
- ☐ Abc card_category
- ☐ Abc card_type
- ☐ Abc cvv_result
- ☐ Abc decision
- ☐ Abc ecl_value
- ☐ Abc ip_city
- ☐ Abc is_hk
- ☐ Abc issuer
- ☐ Abc merchantmcc
- ☐ Abc pay_cnt_cat
- ☐ Abc pay_fail_cnt_cat
- ☐ Abc pay_method_new
- ☐ Abc pay_success_cnt...

new calculation field

FIG. 3

TRANSACTION INDICATOR MONITORING METHODS, APPARATUSES, AND DEVICES

CROSS-REFERENCE TO RELATED APPLICATIONS

This application is a continuation of PCT Application No. PCT/CN2019/091027, filed on Jun. 13, 2019, which claims priority to Chinese Patent Application No. 201810786573.X, filed on Jul. 17, 2018, and each application is hereby incorporated by reference in its entirety.

TECHNICAL FIELD

Embodiments of the present specification relate to transaction data processing technologies, and in particular, to transaction indicator monitoring methods, apparatuses, and devices.

BACKGROUND

In the Internet financial service, whether transaction indicators (also referred to as data indicators) are stable directly affects whether the service can be carried out securely and smoothly. Especially in the field of risk control, how to monitor whether the transaction indicators are abnormal and identify the cause plays a vital role in the timely processing.

Conventional analysis is generally as follows: Data analysts define rules; when a value of a transaction indicator exceeds a certain threshold, the transaction indicator is defined as abnormal; in such case, some possible causes are screened out through manual programming, and each related transaction is manually checked to finally locate the real cause.

SUMMARY

Embodiments of the present specification provide transaction indicator monitoring methods, apparatuses, and devices, so as to automatically identify an abnormality of a transaction indicator and locate a cause for the abnormality.

According to a first aspect, some embodiments of the present specification provide a transaction indicator monitoring method, including the following: obtaining sampling sequences of a transaction indicator of transaction data under multiple sets of transaction dimension values of the transaction data respectively, where each set of transaction dimension values corresponds to one sampling sequence, one sampling sequence includes values of the transaction indicator at a predetermined quantity of sampling points under one set of transaction dimension values, and a value of the transaction indicator at a target sampling point is an actual value; calculating, for each sampling sequence, an estimated value of the transaction indicator at a target sampling point in the sampling sequence based on the sampling sequence; and comparing, for each sampling sequence, the estimated value of the transaction indicator at the target sampling point in the sampling sequence with an actual value, to determine whether a value of the transaction indicator at the target sampling point under one set of transaction dimension values corresponding to the sampling sequence is abnormal, and giving an abnormality prompt.

According to a second aspect, some embodiments of the present specification provide a transaction indicator monitoring apparatus, including the following: a sampling sequence acquisition module, configured to obtain sampling sequences of a transaction indicator of transaction data under multiple sets of transaction dimension values of the transaction data respectively, where each set of transaction dimension values corresponds to one sampling sequence, one sampling sequence includes values of the transaction indicator at a predetermined quantity of sampling points under one set of transaction dimension values, and a value of the transaction indicator at a target sampling point is an actual value; an estimated value calculation module, configured to calculate, for each sampling sequence, an estimated value of the transaction indicator at a target sampling point in the sampling sequence based on the sampling sequence; and an abnormality monitoring module, configured to compare, for each sampling sequence, the estimated value of the transaction indicator at the target sampling point in the sampling sequence with an actual value, to determine whether a value of the transaction indicator at the target sampling point under one set of transaction dimension values corresponding to the sampling sequence is abnormal, and give an abnormality prompt.

According to a third aspect, some embodiments of the present specification provide a transaction indicator monitoring device, including the following: a memory, configured to store a computer program; and a processor, configured to execute the computer program to implement the steps of the method described in any one of some previous embodiments.

According to a fourth aspect, some embodiments of the present specification provide a computer readable storage medium, where the computer readable storage medium stores a computer program, and the computer program is executed by a processor to implement the steps of the method described in any one of some previous embodiments.

Some embodiments of the present specification bring the following beneficial effects:

For a transaction indicator to be monitored, sampling sequences of the transaction indicator under multiple sets of transaction dimension values are obtained respectively; an estimated value of the transaction indicator at a target sampling point in each sampling sequence is calculated; the estimated value at the target sampling point is compared with an actual value to determine whether a value of the transaction indicator at the target sampling point under one corresponding set of transaction dimension values is abnormal, that is, to determine whether the transaction indicator to be monitored at the target sampling point under different combinations of transaction dimension values (i.e., various possible causes for the abnormality) is abnormal, and an abnormality prompt is given. It can be seen that, according to the technical solutions provided in some embodiments of the present specification, the transaction indicator is automatically monitored based on various possible causes for the abnormality. If a value of the transaction indicator corresponding to an identified cause for the abnormality is abnormal, an abnormality of the transaction indicator is monitored, and a cause for the abnormality is located, so that the processing efficiency is high.

BRIEF DESCRIPTION OF DRAWINGS

FIG. 3 is a schematic diagram illustrating a human-computer interaction interface, according to some embodiments of the present specification;

DESCRIPTION OF EMBODIMENTS

To better understand the previous technical solutions, the following describes the technical solutions of some embodiments of the present specification in detail with reference to accompanying drawings and specific embodiments. It should be understood that some embodiments of the present specification and the specific features in some embodiments are detailed descriptions of the technical solutions in some embodiments of the present specification, rather than limitations on the technical solutions in the present specification. Some embodiments of the present specification and the technical features in some embodiments can be combined with each other without conflicts.

Figure 1:
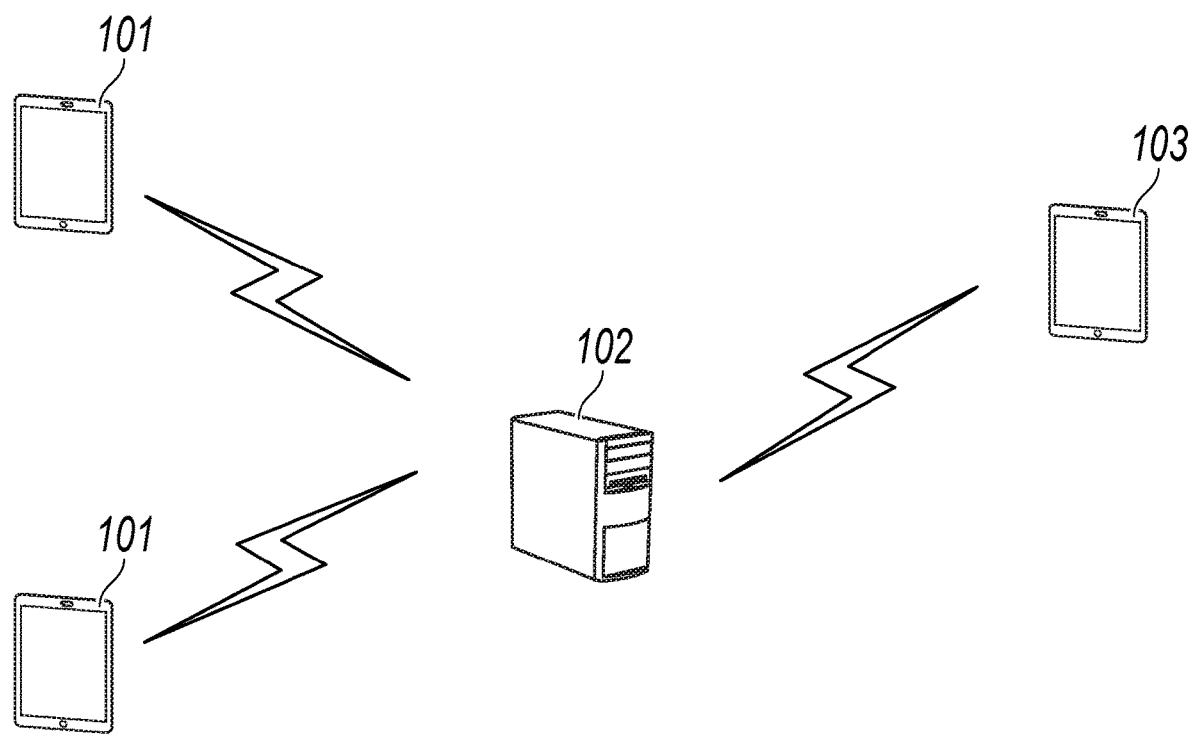
FIG. 1 is a schematic diagram illustrating an application scenario, according to some embodiments of the present specification.

A typical application scenario of some embodiments of the present specification is shown in FIG. 1. A transaction user uses a transaction client device 101 to perform a transaction operation by using an Internet financial server 102. The Internet financial server 102 stores transaction data. The user who needs to monitor the transaction indicator communicates with the Internet financial server 102 by using at least one monitoring client device 103, sets a monitoring condition, and obtains a monitoring result.

For example, technical carriers involved in the transaction operation can include near field communication (NFC), Wi-Fi, 3G/4G/5G, POS card swipe technology, two-dimensional code scanning technology, barcode scanning technology, Bluetooth, infrared, short message service (SMS), multimedia message service (MMS), etc.

The transaction client device 101 can include but is not limited to a mobile terminal, a PDA, a PC, POS machine, etc. The Internet financial server 102 can include an independent server or a server group composed of multiple servers. If multiple servers are included, the topology can include either a centralized server group or a distributed server group (such as a server cluster, a cloud server, etc.). The monitoring client device 103 can include but is not limited to a mobile terminal, a PDA, a PC, etc.

The method provided in one or more embodiments of the present specification can be implemented on the Internet financial server 102, or on the monitoring client device 103, or can be implemented jointly by the Internet financial server 102 and the monitoring client device 103. Specific implementations are described in detail in the following specific embodiments.

Complete transaction data includes multiple transaction dimensions, and each transaction dimension includes at least one transaction dimension value. The transaction dimensions include fields used to reflect payment and risk control characteristics of the transaction, for example, "country", "service type", "bank identification number (BIN)", "card issuing bank", "whether transaction is rejected", "whether 3DS verification is performed", "whether 3DS verification succeeds", etc.

The transaction indicator is used to reflect statistical characteristics of transaction data, for example, "payment success rate", "transaction quantity", "transaction amount", etc. The transaction indicator is related to time and a transaction dimension. Measuring the transaction indicator usually means measuring statistical characteristics of the transaction data within a specific time range and under a specific transaction dimension value of a certain transaction dimension or a combination of some transaction dimensions.

Figure 2:
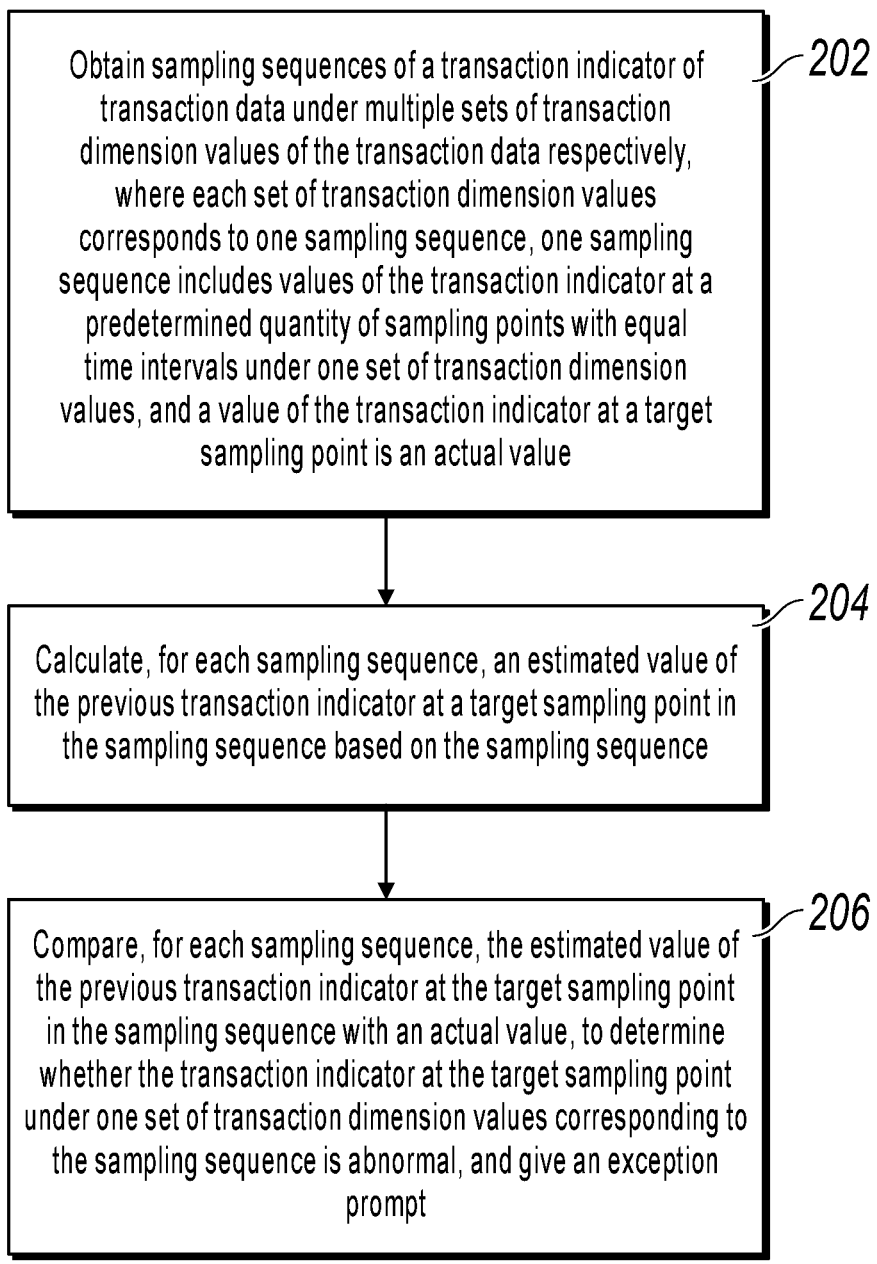
FIG. 2 is a flowchart illustrating a method, according to a first aspect of some embodiments of the present specification.

According to a first aspect, some embodiments of the present specification provide a transaction indicator monitoring method, as shown in FIG. 2, including the following:

Step 202: Obtain sampling sequences of a transaction indicator of transaction data under multiple sets of transaction dimension values of the transaction data respectively, where each set of transaction dimension values corresponds to one sampling sequence, one sampling sequence includes values of the transaction indicator at a predetermined quantity of sampling points under one set of transaction dimension values, and a value of the transaction indicator at a target sampling point is an actual value.

A time interval of sampling points in the sampling sequence reflects a time granularity of monitoring. Equal time intervals or unequal time intervals can be used. For example, equal time intervals are used. If it is expected that the transaction indicator is monitored every hour, a time interval of sampling points is one hour. If it is expected that the transaction indicator is monitored every day, a time interval of sampling points is one day.

The transaction indicator "payment success rate" is used as an example. Assume that the predetermined time interval is one day and the predetermined quantity is N (N is an integer greater than 1). Then a sampling sequence of "payment success rate" under the set of transaction dimension values "country=United Kingdom" and "whether 3DS verification succeeds=succeeds" is $\{a_1, a_2, \ldots, a_N\}$, where a value of "payment success rate" at a sampling point $a_i$ (i=1, 2, ..., N) is an actual value of the payment success rate of the transaction data where "country" is the UK and the 3DS verification succeeds on the $i^{th}$ day.

Step 204: Calculate, for each sampling sequence, an estimated value of the previous transaction indicator at a target sampling point in the sampling sequence based on the sampling sequence.

One sampling sequence is used as an example. An estimated value of the transaction indicator at a target sampling point in the sampling sequence is calculated based on the sampling sequence.

Step 206: Compare, for each sampling sequence, the estimated value of the previous transaction indicator at the target sampling point in the sampling sequence with an actual value, to determine whether the transaction indicator at the target sampling point under one set of transaction dimension values corresponding to the sampling sequence is abnormal, and give an abnormality prompt.

One sampling sequence is used as an example. The estimated value of the transaction indicator at the target sampling point in the sampling sequence is compared with an actual value, to determine whether the transaction indicator at the target sampling point under one set of transaction dimension values corresponding to the sampling sequence is abnormal.

Assuming that the value of the transaction indicator "payment success rate" at the target sampling point under the set of transaction dimension values "UK+3DS verification success" is abnormal, the abnormality prompt information is used to indicate the value of "payment success rate" at the target sampling point and the set of transaction dimension values "UK+3DS verification success" (i.e., the cause for the abnormality).

In some embodiments of the present specification, values of all abnormal transaction indicators and a corresponding set of transaction dimension values can be prompted, or only values of some abnormal transaction indicators and a corresponding set of transaction dimension values can be prompted.

According to the method provided in some embodiments of the present specification, for a transaction indicator to be monitored, sampling sequences of the transaction indicator under multiple sets of transaction dimension values are obtained respectively; an estimated value of the transaction indicator at a target sampling point in each sampling sequence is calculated; the estimated value at the target sampling point is compared with an actual value to determine whether the transaction indicator at the target sampling point under one corresponding set of transaction dimension values is abnormal, that is, to determine whether a value of the transaction indicator to be monitored at the target sampling point under different combinations of transaction dimension values (i.e., various possible causes for the abnormality) is abnormal, and then abnormality prompt information used to indicate the value of the abnormal transaction indicator and the cause for the abnormality is generated and sent. It can be seen that, according to the technical solutions provided in some embodiments of the present specification, the transaction indicator is automatically monitored based on various possible causes for the abnormality. If a value of the transaction indicator corresponding to an identified cause for the abnormality is abnormal, an abnormality of the transaction indicator is monitored, and a cause for the abnormality is located, so that the processing efficiency is high.

In some previous embodiments of the present specification, the transaction indicator can be designated by the user before each monitoring, or can be designated by the user before certain monitoring, and the transaction indicator to be monitored is determined based on the designation for each subsequent monitoring until the user performs designation again. Alternatively, the transaction indicator to be monitored can be a default value of a program, or determined in other methods. The previous multiple sets of transaction dimension values can be designated by the user before each monitoring, or can be designated by the user before certain monitoring, and the multiple sets of transaction dimension values are determined based on the designation for each subsequent monitoring until the user performs designation again. Alternatively, each set of transaction dimension values of all dimensions or dimension combinations of the transaction data can be used as the previous multiple sets of transaction dimension values.

In the case of designation by the user, the user can designate only a transaction dimension and/or a combination of transaction dimensions. In such case, all transaction dimension values of the transaction dimension and/or transaction dimension combination designated by the user are traversed to obtain multiple sets of transaction dimension values.

If the method provided in some embodiments of the present specification is applied to the financial service server 102, the financial service server 102 communicates with the monitoring client device 103, and invokes a corresponding human-computer interaction interface on the monitoring client device 103, so as to obtain user-designated information (transaction indicators, multiple sets of transaction dimension values, or transaction dimensions) through the human-computer interaction interface. Serving as examples instead of limitations, the human-computer interaction interface can be shown in FIG. 3, that is, configuration of corresponding information is completed in the human-computer interaction interface, to improve processing efficiency. In the human-computer interaction interface shown in FIG. 3, the user can not only designate the transaction dimensions and transaction indicators to be monitored, but also designate a range of transaction data to be monitored (that is, designate a collection of the transaction data).

In some embodiments of the present specification, if multiple sets of transaction dimension values are obtained by traversing all transaction dimension values under various combinations of a predetermined quantity of transaction dimensions (in some embodiments of the present specification, a single transaction dimension is also a combination of transaction dimensions), it is further monitored whether the transaction indicators are abnormal under the multiple sets of dimension values respectively, that is, full abnormality monitoring. Assuming that there are three transaction dimensions, there are seven transaction dimension combinations. Assuming that each transaction dimension corresponds to two transaction dimension values, there are 26 sets of transaction dimension values in total. Through full abnormality monitoring, with the help of powerful processing capabilities of a computer, it can be monitored whether the transaction indicator is abnormal from the perspective of various possible causes for the abnormality, thereby improving the accuracy of abnormality monitoring and the precision of abnormality locating.

To ensure transaction security and maintain a normal transaction order, it is necessary to identify an abnormality of the transaction indicator and locate causes for the abnormality in time. Therefore, in conjunction with a time granularity of monitoring, the value of the transaction indicator at the latest sampling point can be monitored in time. Correspondingly, the previous target sampling point refers to the last sampling point in the sampling sequence. For example, to monitor "payment success rate" every natural day, the target sampling point is the current day.

It should be noted that, if a real-time requirement for monitoring abnormal transaction indicators is not high, there is no need to monitor the value at the latest sampling point in real time. In such case, the previous target sampling point can be any sampling point in the sampling sequence.

In some embodiments of the present specification, to improve the accuracy of monitoring the transaction indicator, a value of the previous transaction indicator at a non-target sampling point in each sampling sequence can be a smoothed value. The smoothed value is obtained by smoothing the actual value.

The previous sampling sequence $\{a_1, a_2, \ldots, a_N\}$ is used as an example. Assume that the current target sampling point is $a_N$, and abnormality determination has been performed for the value of the transaction indicator at the sampling point $a_{N-1}$. Therefore, values at the sampling points $a_1$ to $a_{N-2}$ have been smoothed before. When abnormality determination is performed for the value at the current target sampling point, there is no need to perform smoothing again, and the smoothed value calculated before can be used directly. For the value at the sampling point $a_{N-1}$, its smoothed value can be calculated, or the previously calculated estimated value can be used as the smoothed value. Such processing method can reduce the calculation amount and improve the processing efficiency.

However, to improve the calculation precision and ensure the accuracy of abnormality monitoring, the smoothed value can be recalculated during each abnormality monitoring. Correspondingly, the specific implementation of step 202 can be as follows: separately obtaining a set of actual values of the transaction indicator at a predetermined quantity of sampling points under each of the multiple sets of transaction dimension values based on a predetermined time interval; and separately smoothing an actual value at another sampling point except the target sampling point in each set of actual values.

The transaction indicator "payment success rate" and the set of transaction dimension values "UK+3DS verification success" are used as an example. Assume that the predetermined time interval is one day and the predetermined quantity is 30 days. In such case, the actual value of the payment success rate for each day of 30 consecutive days under "UK+3DS verification success" is obtained, and the actual values of the payment success rate for the previous 29 days are smoothed.

A specific implementation of smoothing is not limited in some embodiments of the present specification. In some implementations, a smoothed value is calculated separately for the actual value at another sampling point except the target sampling point in each set of actual values. A difference of the transaction indicator at the another sampling point under each set of transaction dimension values is compared with a first threshold corresponding to the set of transaction dimension values, where the difference at the another sampling point is a difference between the actual value and the smoothed value of the transaction indicator at the same another sampling point, and the first threshold corresponding to each set of transaction dimension values is determined based on values of the transaction indicator at multiple sampling points under the set of transaction dimension values; and an actual value for which the difference exceeds the first threshold is replaced with a smoothed value. In some other implementations, threshold determination is not performed, and the actual value at each sampling point is directly replaced with the corresponding smoothed value.

There are multiple methods for calculating the smoothed value. For example, filtering algorithms such as moving average and moving median can be used to calculate the smoothed value.

The first threshold can be specifically determined based on the Adaptive K Sigma Threshold algorithm.

Based on any one of some previous method embodiments, the implementation of step 204 can be specifically as follows: calculating, for each sampling sequence, an estimated value of the transaction indicator at the target sampling point in the sampling sequence based on a value at another sampling point except the target sampling point in the sampling sequence. It should be noted that, the estimated value of the transaction indicator at the target sampling point can be calculated with reference to the actual value of the transaction indicator at the target sampling point.

There are multiple specific methods for calculating the estimated value. In some implementations, for each sampling sequence, a historical average value of the transaction indicator in the sampling sequence is calculated, where the historical average value is an average of values of the transaction indicator at other sampling points except the target sampling point in the sampling sequence; and the historical average value of the transaction indicator in the sampling sequence is determined as the estimated value of the transaction indicator at the target sampling point in the sampling sequence.

Based on any one of some previous method embodiments, optionally, the implementation of step 206 can be as follows: comparing a difference of the transaction indicator at the target sampling point under the set of transaction dimension values with a second threshold corresponding to the set of transaction dimension values, where the difference at the target sampling point is a difference between the actual value and the estimated value of the transaction indicator at the target sampling point, and the second threshold corresponding to each set of transaction dimension values is determined based on values of the transaction indicator at multiple sampling points under the set of transaction dimension values; and separately determining, based on a comparison result under each set of transaction dimension values, whether the transaction indicator at the target sampling point under the set of transaction dimension values is abnormal.

The second threshold can be specifically determined based on the Adaptive K Sigma Threshold algorithm.

In some embodiments of the present specification, considering that the actual value may be greater than the estimated value (or the smoothed value) or may be less than the estimated value, that is, the difference may be a positive number or a negative number, therefore, the second threshold (or the first threshold) can include an upper limit and a lower limit. Correspondingly, the difference exceeding the second threshold (or the first threshold) means that the difference is above the upper limit or below the lower limit.

Figure 4:
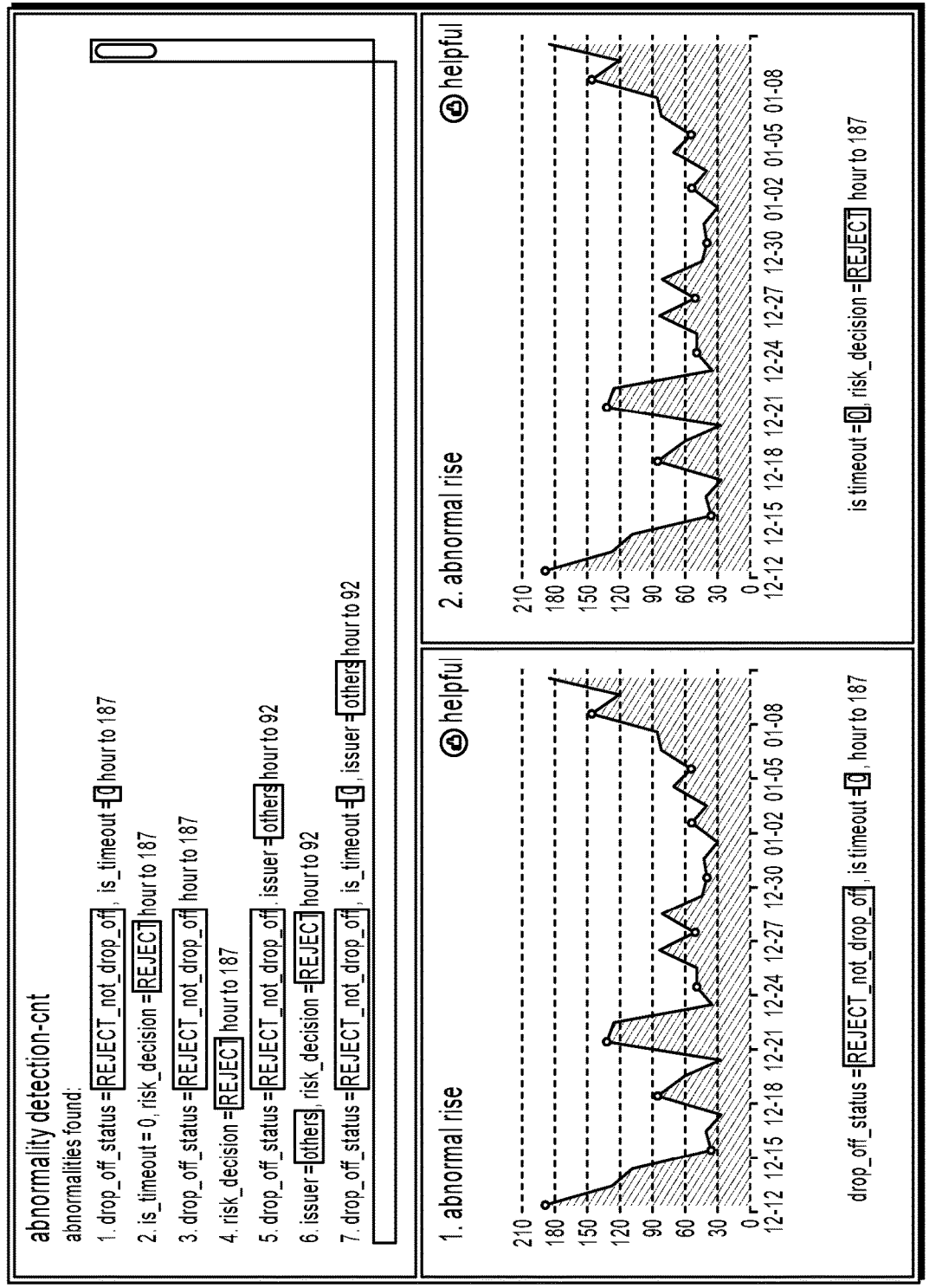
FIG. 4 is a schematic diagram illustrating an abnormality prompt interface, according to some embodiments of the present specification.

In some embodiments of the present specification, the previous abnormality prompt information can be visually presented. Serving as examples instead of limitations, as shown in FIG. 4, the value of the transaction indicator at each sampling point can be reflected by a curve, and an abnormal value can be marked. In addition, causes and results for the abnormality can be presented in a natural language. The natural language is relative to a programming language, and can be a text or a string that is easy to understand. Using the method provided in the present specification may cause the following case: The transaction indicator is abnormal under more than one set of transaction dimension values. For example, under the two sets of transaction dimension values "country=UK", and "country=UK" and "3DS verification success", the payment success rate on that day is abnormal. Thus, to more accurately reflect the cause for the abnormality, different causes for the abnormality can be sorted based on the abnormality confidence level. Correspondingly, an abnormality confidence level of a value of the abnormal transaction indicator is calculated; multiple pieces of abnormality prompt information that are sorted based on the abnormality confidence level are generated and sent, where each abnormality prompt information corresponds to a value of one abnormal transaction indicator and a transaction dimension value.

Confidence levels can be calculated for all abnormal results, but only the first K abnormal results are sent and presented.

Based on any one of some previous method embodiments, the method provided in some embodiments of the present specification can also adjust the sorting of abnormality prompt information based on the user's feedback. Correspondingly, feedback information of the abnormality prompt information is obtained, where the feedback information is used to indicate whether the abnormality prompt information is accurate; and the sorting of the abnormality prompt information is modified based on the feedback information. The specific implementation can include but is not limited to: for accurate abnormality prompt information, increasing the corresponding abnormality confidence level; for incorrect abnormality prompt information, decreasing the corresponding abnormality confidence level or deleting the incorrect abnormality prompt information.

To inform a relevant user of an abnormality of the transaction indicator in time, a third threshold can further be set. When the value of the transaction indicator under a certain set of transaction dimension values exceeds the third threshold, an alarm signal is sent to the target receiver. Correspondingly, the abnormal value and the cause for the abnormality can be included in the alarm signal.

Figure 5:
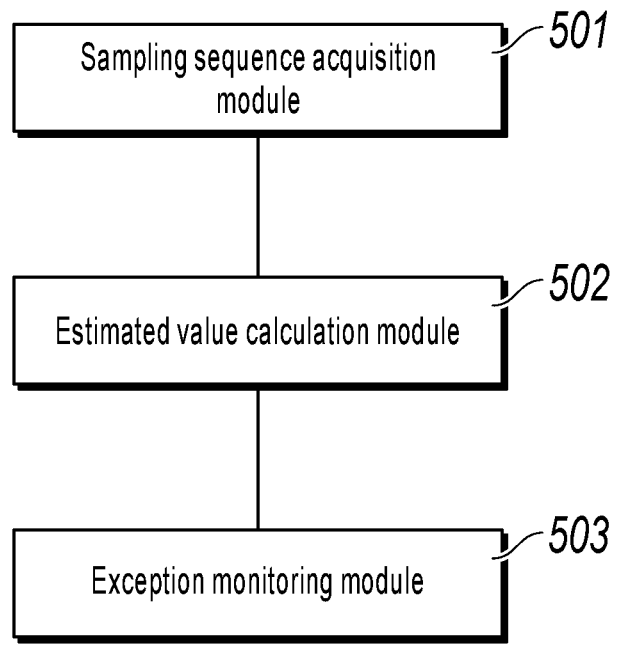
FIG. 5 is a schematic diagram illustrating an apparatus, according to some embodiments of the present specification.

According to a second aspect, some embodiments of the present specification provide a transaction indicator monitoring apparatus, as shown in FIG. 5, including the following: a sampling sequence acquisition module 501, configured to obtain sampling sequences of a transaction indicator of transaction data under multiple sets of transaction dimension values of the transaction data respectively, where each set of transaction dimension values corresponds to one sampling sequence, one sampling sequence includes values of the transaction indicator at a predetermined quantity of sampling points under one set of transaction dimension values, and a value of the transaction indicator at a target sampling point is an actual value; an estimated value calculation module 502, configured to separately calculate, for each sampling sequence, an estimated value of the transaction indicator at a target sampling point in the sampling sequence based on the sampling sequence; and an abnormality monitoring module 503, configured to compare, for each sampling sequence, the estimated value of the transaction indicator at the target sampling point in the sampling sequence with an actual value, to determine whether the transaction indicator at the target sampling point under one set of transaction dimension values corresponding to the sampling sequence is abnormal, and give an abnormality prompt.

Optionally, a value of the transaction indicator at a non-target sampling point in each sampling sequence is a smoothed value, and the smoothed value is obtained by smoothing the actual value.

Optionally, the sampling sequence acquisition module is configured to: separately obtain a set of actual values of the transaction indicator at a predetermined quantity of sampling points under each of the multiple sets of transaction dimension values based on a predetermined time interval; and separately smooth an actual value at another sampling point except the target sampling point in each set of actual values.

Optionally, when separately smoothing the actual value at another sampling point except the target sampling point in each set of actual values, the sampling processing module is configured to: separately calculate a smoothed value for the actual value at the another sampling point except the target sampling point in each set of actual values; compare a difference of the transaction indicator at the another sampling point under each set of transaction dimension values with a first threshold corresponding to the set of transaction dimension values, where the difference at the another sampling point is a difference between the actual value and the smoothed value of the transaction indicator at the same another sampling point, and the first threshold corresponding to each set of transaction dimension values is determined based on values of the transaction indicator at multiple sampling points under the set of transaction dimension values; and replace an actual value for which the difference exceeds the first threshold with a smoothed value.

Based on any one of some previous apparatus embodiments, optionally, the target sampling point is the last sampling point in the sampling sequence.

Optionally, the estimated value calculation module is configured to calculate, for each sampling sequence, an estimated value of the transaction indicator at the target sampling point in the sampling sequence based on a value at another sampling point except the target sampling point in the sampling sequence.

Optionally, the estimated value calculation module is configured to calculate, for each sampling sequence, a historical average value of the transaction indicator in the sampling sequence, where the historical average value is an average of values of the transaction indicator at other sampling points except the target sampling point in the sampling sequence; and the historical average value of the transaction indicator in the sampling sequence is determined as the estimated value of the transaction indicator at the target sampling point in the sampling sequence.

Optionally, the abnormality monitoring module is configured to: compare a difference of the transaction indicator at the target sampling point under the set of transaction dimension values with a second threshold corresponding to the set of transaction dimension values, where the difference at the target sampling point is a difference between the actual value and the estimated value of the transaction indicator at the target sampling point, and the second threshold corresponding to each set of transaction dimension values is determined based on values of the transaction indicator at multiple sampling points under the set of transaction dimension values; and separately determine, based on a comparison result under each set of transaction dimension values, whether the transaction indicator at the target sampling point under the set of transaction dimension values is abnormal.

Optionally, the apparatus provided in some embodiments of the present specification further includes a confidence level calculation module, configured to calculate an abnormality confidence level of the abnormal transaction indicator; the abnormality monitoring module is configured to: generate and send multiple pieces of abnormality prompt information that are sorted based on the abnormality confidence level, where each abnormality prompt information corresponds to the target sampling point and a transaction dimension value of one abnormal transaction indicator.

Optionally, the apparatus provided in some embodiments of the present specification further includes a modification module, configured to obtain feedback information of the abnormality prompt information, where the feedback information is used to indicate whether the abnormality prompt information is accurate; and the sorting of the abnormality prompt information is modified based on the feedback information.

According to a third aspect, some embodiments of the present specification provide a transaction indicator monitoring device, including the following: a memory, configured to store a computer program; and a processor, configured to execute the computer program to implement the steps of the method described in any one of some previous embodiments.

According to a fourth aspect, some embodiments of the present specification provide a computer readable storage medium, where the computer readable storage medium stores a computer program, and the computer program is executed by a processor to implement the steps of the method described in any one of some previous embodiments.

The present specification is described with reference to the flowcharts and/or block diagrams of the method, the device (system), and the computer program product based on some embodiments of the present specification. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a special-purpose computer, an embedded processor, or a processor of any other programmable data processing device to generate a machine, so that the instructions executed by a computer or a processor of any other programmable data processing device generate a device for implementing a specific function in one or more processes in the flowcharts and/or in one or more blocks in the block diagrams.

These computer program instructions can also be stored in a computer readable memory that can instruct the computer or any other programmable data processing device to work in a specific method, so that the instructions stored in the computer readable memory generate an artifact that includes an instruction device. The instruction device implements a specific function in one or more processes in the flowcharts and/or in one or more blocks in the block diagrams.

These computer program instructions can be loaded onto the computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present specification have been described, a person skilled in the art can make changes and modifications to these embodiments once understanding the basic inventive concept. Therefore, the appended claims are intended to be construed as to cover some preferred embodiments and all changes and modifications falling within the scope of the present specification.

Clearly, a person skilled in the art can make various modifications and variations to the present specification without departing from the spirit and scope of the present specification. The present specification is intended to cover these modifications and variations provided that they fall within the scope of the claims of the present specification and their equivalent technologies.

What is claimed is:

1. A computer-implemented method for transaction indicator monitoring, comprising:
   storing transaction data of a transaction in a transaction server used by a transaction client device to perform the transaction, wherein the transaction data comprises a plurality of transaction dimensions, wherein each of the plurality of transaction dimensions includes fields that are used to reflect payment and risk control characteristics of the transaction, and wherein the each of the plurality of transaction dimensions includes one or more transaction dimension values;
   specifying, through an interface of a monitoring device, a plurality of transaction indicators including a first transaction indicator and, for each of the plurality of transaction indicators including the first transaction indicator, multiple sets of transaction dimension values to be monitored, wherein a transaction indicator is used to reflect statistical characteristics of the transaction data;
   obtaining, by the monitoring device based on a user specified time range, monitoring transaction data associated with a specified plurality of transaction indicators including the first transaction indicator, wherein sampling sequences of the first transaction indicator are obtained under the multiple sets of transaction dimension values of the monitoring transaction data respectively, wherein each set of transaction dimension values corresponds to one sampling sequence, respectively, wherein a first sampling sequence comprises values of the first transaction indicator at a predetermined quantity of sampling points under a first set of transaction dimension values, and a value of the first transaction indicator at a target sampling point in the first sampling sequence is a first actual value;
   calculating, by monitoring device and for the first sampling sequence, an estimated value, wherein the estimated value is an estimated value of the first transaction indicator at the target sampling point in the first sampling sequence based on the first sampling sequence;
   calculating, by the monitoring device, a target sampling point difference between the first actual value and the estimated value;
   determining, by the monitoring device, the value of the first transaction indicator at the target sampling point under the first set of transaction dimension values corresponding to the first sampling sequence is abnormal when the target sampling point difference exceeds an abnormality threshold, wherein the abnormality threshold corresponds to the first set of transaction dimension values; and
   displaying, by the monitoring device, an abnormality prompt, wherein the abnormality prompt includes a value of an abnormal transaction indicator and a corresponding set of transaction dimension values, and wherein the set of transaction dimension values indicates a cause for the abnormality.

2. The computer-implemented method of claim 1, comprising:
   obtaining, by the monitoring device and as an obtained smoothed value, a smoothed value at an another sampling point in the first sampling sequence by smoothing a second actual value, the another sampling point is a non-target sampling point in the first sampling sequence, and the second actual value is an actual value at the another sampling point, wherein the obtained smoothed value is a value of the first transaction indicator at the another sampling point in the first sampling sequence.

3. The computer-implemented method of claim 2, wherein obtaining the first sampling sequence comprises:
   separately obtaining a set of actual values of the first transaction indicator at the predetermined quantity of sampling points under the first set of transaction dimension values based on a predetermined time interval; and
   separately smoothing the second actual value at the another sampling point except the target sampling point in the set of actual values.

4. The computer-implemented method of claim 3, wherein separately smoothing the second actual value at the another sampling point except the target sampling point in the set of actual values comprises:
   separately calculating a smoothed value for the second actual value at the another sampling point except the target sampling point in the set of actual values, wherein the smoothed value is calculated based on moving average method or a previously calculated estimated value is used as the smoothed value;
   comparing a difference of the first transaction indicator at the another sampling point under the first set of transaction dimension values with a first threshold corresponding to the first set of transaction dimension values, wherein the difference at the another sampling point is a difference between the second actual value and the smoothed value of the first transaction indicator at a same another sampling point, and the first threshold corresponding to the first set of transaction dimension values is determined based on values of the first transaction indicator at multiple sampling points under the first set of transaction dimension values; and replacing the second actual value for which the difference exceeds the first threshold with the smoothed value.

5. The computer-implemented method of claim 1, wherein the target sampling point is a last sampling point in the first sampling sequence.

6. The computer-implemented method of claim 1, wherein the calculating, for the first sampling sequence, the estimated value based on the first sampling sequence comprises:

calculating, for the first sampling sequence, the estimated value based on a value at an another sampling point except the target sampling point in the first sampling sequence.

7. The computer-implemented method of claim 1, wherein the calculating, for the first sampling sequence, the estimated value based on the first sampling sequence comprises:

calculating, for the first sampling sequence, a historical average value of the first transaction indicator in the first sampling sequence, wherein the historical average value is an average of values of the first transaction indicator at other sampling points except the target sampling point in the first sampling sequence; and determining, for the first sampling sequence, the historical average value of the first transaction indicator in the first sampling sequence as the estimated value.

8. The computer-implemented method of claim 1, wherein the determining, for the first sampling sequence a value of the first transaction indicator at the target sampling point under the first set of transaction dimension values corresponding to the first sampling sequence is abnormal comprises:

determining an abnormality threshold, wherein the abnormality threshold is determined based on values of the first transaction indicator at multiple sampling points under the first set of transaction dimension values and the abnormality threshold specifies a range with an upper limit and an lower limit;

comparing the target sampling point difference with the abnormality threshold to obtain a comparison result under the first set of transaction dimension values; and determining, based on the comparison result under the first set of transaction dimension values, the value of the first transaction indicator at the target sampling point under the first set of transaction dimension values is abnormal when the comparison result exceeds the range of the abnormality threshold.

9. The computer-implemented method of claim 1, wherein before displaying the abnormality prompt:

calculating an abnormality confidence level of a value of an abnormal transaction indicator; and displaying the abnormality prompt comprises:

generating and sending multiple pieces of abnormality prompt information that are sorted based on the abnormality confidence level, wherein each abnormality prompt information corresponds to a value of one abnormal transaction indicator and one set of transaction dimension values.

10. The computer-implemented method of claim 9, comprising:

obtaining feedback information of the abnormality prompt information, wherein the feedback information is used to indicate whether the abnormality prompt information is accurate; and modifying sorting of the abnormality prompt information based on the feedback information.

11. A non-transitory, computer-readable medium storing one or more instructions that, when executed by a computer system, cause the computer system to perform one or more operations comprising:

storing transaction data of a transaction that is used to perform the transaction, wherein the transaction data comprises a plurality of transaction dimensions, wherein each of the plurality of transaction dimensions includes fields that are used to reflect payment and risk control characteristics of the transaction, and wherein the each of the plurality of transaction dimensions includes one or more transaction dimension values;

specifying a plurality of transaction indicators including a first transaction indicator and, for each of the plurality of transaction indicators including the first transaction indicator, multiple sets of transaction dimension values to be monitored, wherein a transaction indicator is used to reflect statistical characteristics of the transaction data;

obtaining, based on a user specified time range, monitoring transaction data associated with a specified plurality of transaction indicators including the first transaction indicator, wherein sampling sequences of the first transaction indicator are obtained under the multiple sets of transaction dimension values of the monitoring transaction data respectively, wherein each set of transaction dimension values corresponds to one sampling sequence, respectively, wherein a first sampling sequence comprises values of the first transaction indicator at a predetermined quantity of sampling points under a first set of transaction dimension values, and a value of the first transaction indicator at a target sampling point in the first sampling sequence is a first actual value;

calculating, for the first sampling sequence, an estimated value, wherein the estimated value is an estimated value of the first transaction indicator at the target sampling point in the first sampling sequence based on the first sampling sequence;

calculating a target sampling point difference between the first actual value and the estimated value;

determining the value of the first transaction indicator at the target sampling point under the first set of transaction dimension values corresponding to the first sampling sequence is abnormal when the target sampling point difference exceeds an abnormality threshold, wherein the abnormality threshold is corresponding to the first set of transaction dimension values; and displaying an abnormality prompt, wherein the abnormality prompt includes a value of an abnormal transaction indicator and a corresponding set of transaction dimension values, and wherein the set of transaction dimension values indicates a cause for the abnormality.

12. The non-transitory, computer-readable medium of claim 11, comprising:

obtaining, as an obtained smoothed value, a smoothed value at an another sampling point in the first sampling sequence by smoothing a second actual value, the another sampling point is a non-target sampling point in the first sampling sequence, and the second actual value is an actual value at the another sampling point, wherein the obtained smoothed value is a value of the first transaction indicator at the another sampling point in the first sampling sequence.

13. The non-transitory, computer-readable medium of claim 12, wherein obtaining the first sampling sequence comprises:
separately obtaining a set of actual values of the first transaction indicator at the predetermined quantity of sampling points under the first set of transaction dimension values based on a predetermined time interval; and
separately smoothing the second actual value at the another sampling point except the target sampling point in the set of actual values.

14. The non-transitory, computer-readable medium of claim 13, wherein separately smoothing the second actual value at the another sampling point except the target sampling point in the set of actual values comprises:
separately calculating a smoothed value for the second actual value at the another sampling point except the target sampling point in the set of actual values, wherein the smoothed value is calculated based on moving average method or a previously calculated estimated value is used as the smoothed value;
comparing a difference of the first transaction indicator at the another sampling point under the first set of transaction dimension values with a first threshold corresponding to the first set of transaction dimension values, wherein the difference at the another sampling point is a difference between the second actual value and the smoothed value of the first transaction indicator at a same another sampling point, and the first threshold corresponding to the first set of transaction dimension values is determined based on values of the first transaction indicator at multiple sampling points under the first set of transaction dimension values; and
replacing the second actual value for which the difference exceeds the first threshold with the smoothed value.

15. The non-transitory, computer-readable medium of claim 11, wherein the target sampling point is a last sampling point in the first sampling sequence.

16. The non-transitory, computer-readable medium of claim 11, wherein the calculating, for the first sampling sequence, the estimated value based on the first sampling sequence comprises:
calculating, for the first sampling sequence, the estimated value based on a value at an another sampling point except the target sampling point in the first sampling sequence.

17. The non-transitory, computer-readable medium of claim 11, wherein the calculating, for the first sampling sequence, the estimated value based on the first sampling sequence comprises:
calculating, for the first sampling sequence, a historical average value of the first transaction indicator in the first sampling sequence, wherein the historical average value is an average of values of the first transaction indicator at other sampling points except the target sampling point in the first sampling sequence; and
determining, for the first sampling sequence, the historical average value of the first transaction indicator in the first sampling sequence as the estimated value.

18. The non-transitory, computer-readable medium of claim 11, wherein the determining, for the first sampling sequence a value of the first transaction indicator at the target sampling point under the first set of transaction dimension values corresponding to the first sampling sequence is abnormal comprises:
determining the abnormality threshold, wherein the abnormality threshold is determined based on values of the first transaction indicator at multiple sampling points under the first set of transaction dimension values and the abnormality threshold specifies a range with an upper limit and an lower limit;
comparing the target sampling point difference with the abnormality threshold to obtain a comparison result under the first set of transaction dimension values; and
determining, based on the comparison result under the first set of transaction dimension values, the value of the first transaction indicator at the target sampling point under the first set of transaction dimension values is abnormal when the comparison result exceeds the range of the abnormality threshold.

19. The non-transitory, computer-readable medium of claim 11, wherein before displaying the abnormality prompt:
calculating an abnormality confidence level of a value of an abnormal transaction indicator; and
displaying the abnormality prompt comprises:
generating and sending multiple pieces of abnormality prompt information that are sorted based on the abnormality confidence level, wherein each abnormality prompt information corresponds to a value of one abnormal transaction indicator and one set of transaction dimension values.

20. The non-transitory, computer-readable medium of claim 19, comprising:
obtaining feedback information of the abnormality prompt information, wherein the feedback information is used to indicate whether the abnormality prompt information is accurate; and
modifying sorting of the abnormality prompt information based on the feedback information.

21. A computer-implemented system, comprising:
a transaction server and
one or more computer memory devices interoperably coupled with the transaction server and having tangible, non-transitory, machine-readable media storing a first set of one or more instructions corresponding to the transaction server that, when the first set of one or more instructions are executed by the transaction server, cause the transaction server to perform one or more operations, comprising:
storing transaction data of a transaction in the transaction server used by a transaction client device to perform the transaction, wherein the transaction data comprises a plurality of transaction dimensions, wherein each of the plurality of transaction dimensions includes fields that are used to reflect payment and risk control characteristics of the transaction, and wherein the each of the plurality of transaction dimensions includes one or more transaction dimension values; and
a monitoring device and one or more computer memory devices interoperably coupled with the monitoring device and having tangible, non-transitory, machine-readable media storing a second set of one or more instructions corresponding to the monitoring device that, when the second set of one or more instructions are executed by the monitoring device, cause the monitoring device to perform one or more operations, comprising:
specifying a plurality of transaction indicators including a first transaction indicator and, for each of the plurality of transaction indicators including the first transaction indicator, multiple sets of transaction dimension values to be monitored, wherein a transaction indicator is used to reflect statistical characteristics of the transaction data;

obtaining, based on a user specified time range, monitoring transaction data associated with a specified plurality of transaction indicators including the first transaction indicator, wherein sampling sequences of the first transaction indicator are obtained under the multiple sets of transaction dimension values of the monitoring transaction data respectively, wherein each set of transaction dimension values corresponds to one sampling sequence, respectively, wherein a first sampling sequence comprises values of the first transaction indicator at a predetermined quantity of sampling points under a first set of transaction dimension values, and a value of the first transaction indicator at a target sampling point in the first sampling sequence is a first actual value;

calculating, for the first sampling sequence, an estimated value, wherein the estimated value is an estimated value of the first transaction indicator at the target sampling point in the first sampling sequence based on the first sampling sequence;

calculating a target sampling point difference between the first actual value and the estimated value;

determining, for the first sampling sequence the value of the first transaction indicator at the target sampling point under the first set of transaction dimension values corresponding to the first sampling sequence is abnormal when the target sampling point difference exceeds an abnormality threshold, wherein the abnormality threshold is corresponding to the first set of transaction dimension values; and displaying an abnormality prompt, wherein the abnormality prompt includes a value of an abnormal transaction indicator and a corresponding set of transaction dimension values, and wherein the set of transaction dimension values indicates a cause for the abnormality.

22. The computer-implemented system of claim 21, wherein the second set of one or more instructions further cause the monitoring device to perform the one or more operations, comprising:

obtaining, as an obtained smoothed value, a smoothed value at an another sampling point in the first sampling sequence by smoothing a second actual value, the another sampling point is a non-target sampling point in the first sampling sequence, and the second actual value is an actual value at the another sampling point, wherein the obtained smoothed value is a value of the first transaction indicator at the another sampling point in the first sampling sequence.

23. The computer-implemented system of claim 22, wherein obtaining the first sampling sequence comprises:

separately obtaining a set of actual values of the first transaction indicator at the predetermined quantity of sampling points under the first set of transaction dimension values based on a predetermined time interval; and separately smoothing the second actual value at the another sampling point except the target sampling point in the set of actual values.

24. The computer-implemented system of claim 23, wherein separately smoothing the second actual value at the another sampling point except the target sampling point in the set of actual values comprises:

separately calculating a smoothed value for the second actual value at the another sampling point except the target sampling point in the set of actual values, wherein the smoothed value is calculated based on moving average method or a previously calculated estimated value is used as the smoothed value;

comparing a difference of the first transaction indicator at the another sampling point under the first set of transaction dimension values with a first threshold corresponding to the first set of transaction dimension values, wherein the difference at the another sampling point is a difference between the second actual value and the smoothed value of the first transaction indicator at a same another sampling point, and the first threshold corresponding to the first set of transaction dimension values is determined based on values of the first transaction indicator at multiple sampling points under the first set of transaction dimension values; and replacing the second actual value for which the difference exceeds the first threshold with the smoothed value.

25. The computer-implemented system of claim 21, wherein the target sampling point is a last sampling point in the first sampling sequence.

26. The computer-implemented system of claim 21, wherein the calculating, for the first sampling sequence, the estimated value based on the first sampling sequence comprises:

calculating, for the first sampling sequence, the estimated value based on a value at an another sampling point except the target sampling point in the first sampling sequence.

27. The computer-implemented system of claim 21, wherein the calculating, for the first sampling sequence, the estimated value based on the first sampling sequence comprises:

calculating, for the first sampling sequence, a historical average value of the first transaction indicator in the first sampling sequence, wherein the historical average value is an average of values of the first transaction indicator at other sampling points except the target sampling point in the first sampling sequence; and determining, for the first sampling sequence, the historical average value of the first transaction indicator in the first sampling sequence as the estimated value.

28. The computer-implemented system of claim 21, wherein the determining, for the first sampling sequence, a value of the first transaction indicator at the target sampling point under the first set of transaction dimension values corresponding to the first sampling sequence is abnormal comprises:

determining the abnormality threshold, wherein the abnormality threshold is determined based on values of the first transaction indicator at multiple sampling points under the first set of transaction dimension values and the abnormality threshold specifies a range with an upper limit and an lower limit;

comparing the target sampling point difference with the abnormality threshold to obtain a comparison result under the first set of transaction dimension values; and determining, based on the comparison result under the first set of transaction dimension values, the value of the first transaction indicator at the target sampling point under the first set of transaction dimension values is abnormal when the comparison result exceeds the range of the abnormality threshold.

29. The computer-implemented system of claim 21, wherein before displaying the abnormality prompt:

calculating an abnormality confidence level of a value of an abnormal transaction indicator; and displaying the abnormality prompt comprises:

generating and sending multiple pieces of abnormality prompt information that are sorted based on the abnormality confidence level, wherein each abnormality prompt information corresponds to a value of one abnormal transaction indicator and one set of transaction dimension values.

30. The computer-implemented system of claim 29, comprising:

obtaining feedback information of the abnormality prompt information, wherein the feedback information is used to indicate whether the abnormality prompt information is accurate; and modifying sorting of the abnormality prompt information based on the feedback information.

* * * * *